United States Patent Office 3,392,305
Patented July 9, 1968

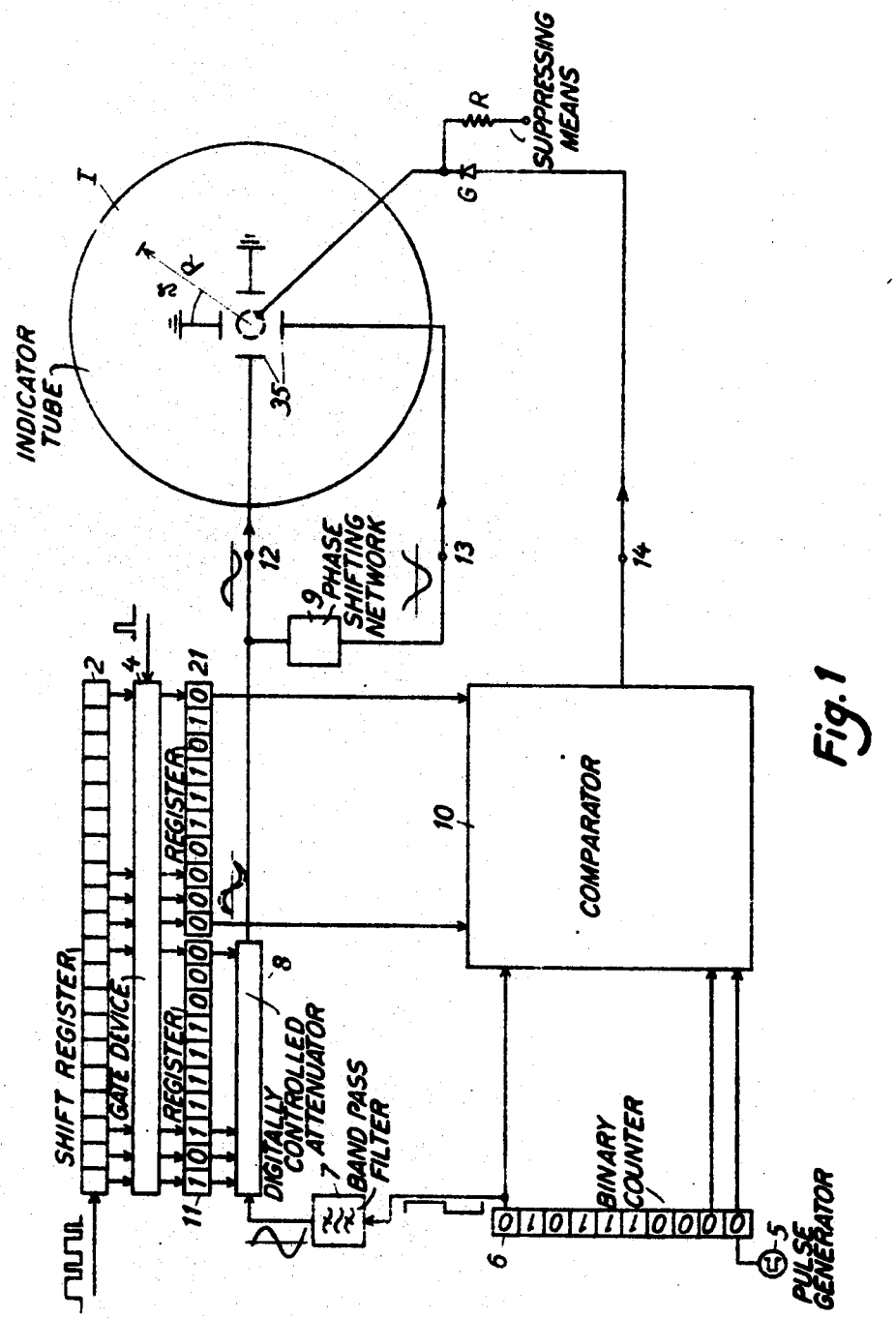

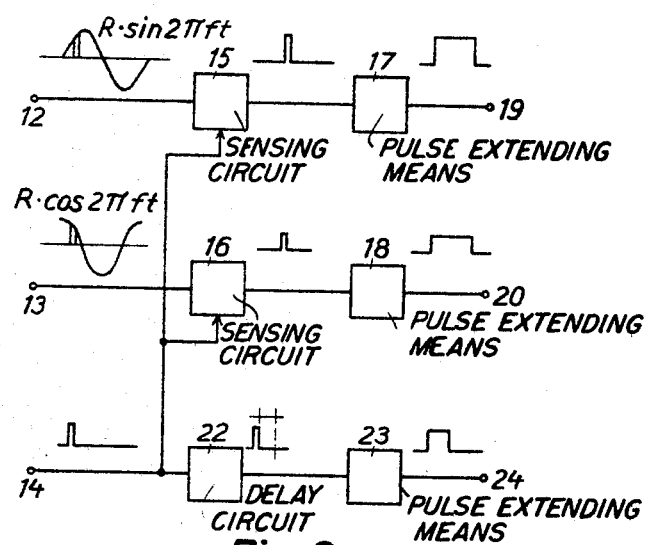
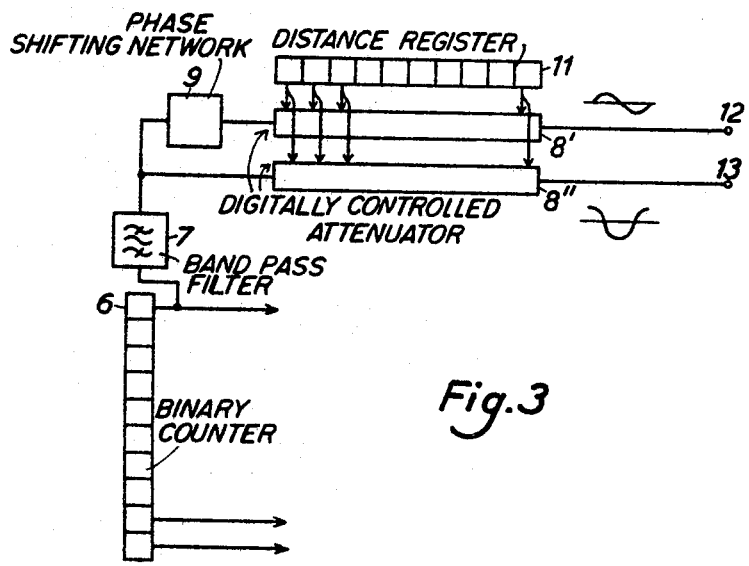

3,392,305
ARRANGEMENT FOR THE PRESENTATION
OF A RADAR IMAGE
Tage Vilhelm Leander Andersson, Alvsjo, Stig Erik
Warring, Skarholmen, Helge T. Warnberg, Alvsjo,
and Klas R. Wickman, Huddinge, Sweden, assignors to Telefonaktiebolaget L M Ericsson,
Stockholm, Sweden, a Swedish corporation
Filed Apr. 5, 1966, Ser. No. 540,331
Claims priority, application Sweden, Apr. 20, 1965,
5,087/65
10 Claims. (Cl. 315—22)

ABSTRACT OF THE DISCLOSURE

There is provided a system for indicating the position of a target on a PPI display. The range and azimuth of the target are specified by binary words representing the distance and angle polar coordinates of the target. A pulse generator feeds a binar counter having cascaded binary counter stages. The output of the last stage is converted to a sinusoidal signal. The binary word or portion thereof representing the distance coordinate controls a binary-controlled attenuator which attenuates the sinusoidal signal in accordance with the value of the binary word. The attenuated sinusoidal signal is converted to two orthogonal sinusoidal signals which drive the defection circuits of the PPI display to generate a circular scan having a radius proportional to the range of the target. The PPI electron beam is normally blanked and only turned on when a coincidence is registered by comparator which compares the angle coordinate binary word or portion thereof and the pulse count being accumulated by the binary counter to indicate the azimuth of the target.

Figure 4:
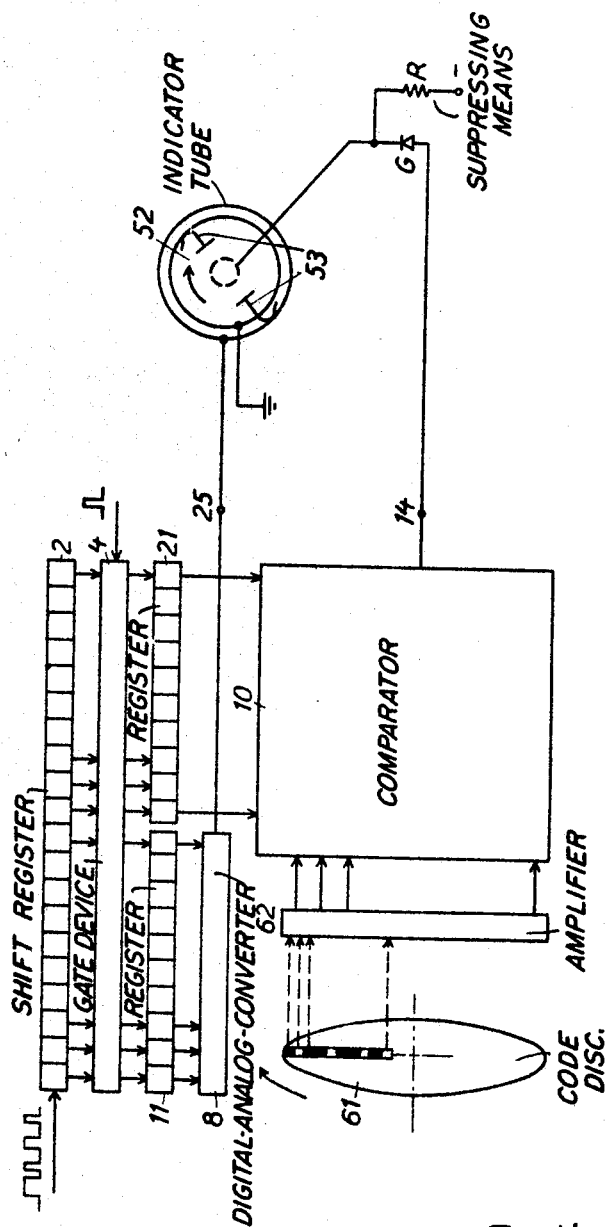

The present invention refers to an arrangement for presenting on a plan position indicator (PPI) a radar image information that is received by the PPI in coded form.

It is often necessary to be able to present a radar image in places which are located at a great distance from the radar set from which the information is coming. For this purpose it has hitherto been necessary to utilize wide band connections, radio relay links or coaxial cables. In this case video- and synchronizing signals are combined to a wide band channel while the angle position of the antenna is transmitted through a special channel. The necessary band width is generally in the order of 1 mHz. It is nowadays customary to carry out transmission through 2–3 video channels from a radar set and the band width of the transmission then usually is about 6 mHz. This transmission system is however expensive for great distances and therefore in most cases should not be used in longer connections than one or a few link lengths. Furthermore the wide band system is not practical for transmission between movable units, for example ships.

It would offer great practical advantages to be able to transfer radar image information through common telephone channels. In this case the information must be transferred into coded form in such a manner that each point (radar target) that is shown on a PPI in the radar set, is transmitted by means of a code corresponding to the coordinates of this point. How this is carried out has been earlier described, see for example Teknisk Tidskrift, 1963, No. 40, pp. 1077–1081.

Transmission can be carried out in Cartesian coordinates. In such a case however, a rather expensive digital equipment is necessary in the radar set for the conversion from polar into Cartesian coordinates. Alternatively transmission can be carried out in polar coordinates, a digital coordinate conversion equipment being necessary on the receiver side. After usual digital-analog conversion voltages are obtained which are proportional to the X- and Y-coordinates of the target which voltages are supplied to the deflecting means of the plan position indicator.

Upon transmission in polar coordinates it is possible to dispense with the expensive digital coordinate conversion equipment and to have a digital-analog converter if presentation can be carried out on a B-indicator. On such an indicator distances are presented as a function of azimuth in rectangular coordinates.

The present invention refers to an arrangement for the presentation of a radar image in the form of points on a plan position indicator by means of a code corresponding to the polar coordinates of the points. The arrangement according to the invention is characterized thereby that it comprises means for supplying a periodic signal to the deflecting means of the indicator, so that the electron beam can occupy an angle position determined by the periodic signal on a circular path. Means are also provided for operating the deflecting means of the indicator under the guidance of the binary distance information, so that the radius of the circular path is proportional to the binary information. The apparatus further includes a counting circuit which, in correspondence to the angle position of the electron beam produces on its outputs a binary number corresponding to the angle position, and furthermore a comparator circuit for detecting both the binary number obtained from the counting circuit and the binary angle information and to activate, upon their coincidence, the electron beam so that a point determined by the binary angle information is produced on the circular path.

The invention involves inter alia the advantage that the rather expensive, digital coordinate conversion equipment can be dispensed with and presentation can occur on a PPI directly from target data in polar coordinates.

The invention will be described more in detail with reference to the accompanying drawing where FIG. 1 shows an embodiment of the arrangement according to the invention, FIG. 2 shows a modification of the arrangement according to FIG. 1, FIG. 3 shows a further modification of the invention according to FIG. 1, and FIG. 4 shows another embodiment of the invention.

In the arrangement according to FIG. 1 two registers 11 and 21 are provided, consisting of for example binary bistable circuits. The registers store in the form of binary words the polar coordinates (the distance and azimuth respectively) for target data during the time necessary for the presentation of a target, for example 10 ms. Register 11 stores the distance or range information and register 21 the azimuth information. If target data arrive in series form, a series-to-parallel converter of known type is necessary to be able to supply the two binary words into the registers 11 and 21 in parallel form. According to FIG. 1 the converter consists of a shift register 2 which receives the data in series form. When the whole information concerning the target has been forwarded in the register 2, a gate device 4 is opened by means of a pulse and the content of the shift register is transmitted to the registers 11 and 21. Data concerning the next target can then be supplied to the shift register 2 and during the time the supplying is carried out the display equipment is working by means of the binary words stored in the registers 11 and 21. Instead of the shift register 2 a buffer memory that is common for several incoming data lines may be arranged in which buffer memory target data from one or more radar sets are stored in parallel, binary form, for example in a ferrite memory. See Teknisk Tidskrift 1964, No. 27, pp. 713–717. Via the gate device 4 new data can be transmitted from the buffer memory to the registers 11 and 21 consisting of bistable circuits as soon as a preceding target has been presented.

In FIG. 1 a pulse generator that generates pulses having a frequency of for example 256 kHz. is indicated by 5. It supplies a binary counter 6 that in known manner comprises a number of stages consisting of binary bistable circuits. Each of the stages produces on its outputs a signal being twice as long as the signal obtained from the preceding stage. If the binary counter contains for example 10 stages, a square voltage will be obtained from the last stage having a frequency which is 1/1024 of the frequency of the pulse generator, i.e. 250 Hz. This signal is supplied to a band pass filter 7 that transforms the squarewave voltage into a sinewave voltage of 250 Hz. This sinewave voltage is supplied to a digitally controlled attenuator 8 described more in detail in connection with FIG. 5. The attenuator also receives the distance coordinates of the target from the register 11 in binary form. From the output of the attenuator 8 a sinewave voltage is then obtained having an amplitude proportional to the distance coordinate of the target. Reference numeral 9 indicates a phase shifting network having a phase shift of 90° for the frequency 250 Hz. In the output line 12 there is thus obtained a voltage $U_{12}=R \sin 2\pi ft$ where R is the distance value of the target and $f$ is 250 Hz. On the output line 13 a voltage $U_{13}=R \cos 2\pi ft$ is obtained. If these voltages are supplied to the deflecting means of an indicator I, a circular scan will be obtained on the image screen of the indicator. The radius of the scan is directly proportional to R as it is easy to see. Normally, however, the control grid of the electron gun of the indicator is held at such a negative potential that the circular scan is not seen on the image screen of the indicator.

A comparator circuit 10, known per se, is connected to the binary counter 6 as well as to the register 21. In register 21 the binary word corresponding to the azimuth of the target in question is stored in order to carry out a permanent comparison between those stages in the binary counter 6 and in the register 21 which have the same sequence number. When the binary counter 6 has been stepped forward to a position where the binary condition in all stages coincides, the comparator circuit 10 will give on its output 14 a coincidence signal which is supplied to the control grid of the electron gun of the indicator as a positive pulse which makes the beam visible on the screen of the indicator. The sine- and cosine voltages in the outputs 12 and 13 which generate the circular scan, are locked in relation to the signal in the binary counter 6. Due to this the brightening pulse occurring on the screen gives a presentation of the target in question both at a correct distance and in a correct azimuth direction on the indicator screen. When the target has been presented, information as to a new target can be supplied to the registers 11 and 21. In the condition indicated in FIG. 1 as an example it has been assumed that the binary distance information was 101111000 and the binary azimuth information was 0000111010.

If a greaater number of targets per second have to be presented the pulse frequency of tthe pulse generator 5 must be increased and thus also the frequency of the sinewave voltage by means of which the circular scan is generated, will increase. This implies that the time during which coincidence is obtained will be shorter. In order to obtain sufficient light intensity of the target presented on the image screen it may then be possible to connect a pulse extender to the output 14, so that the target is presented for a longer time than the time during which coincidence is obtained. The pulse extender can for example consist of a monostable circuit which thus supplies the brightening pulse to the control grid of the electron gun. If however the brightening pulse is too long, a target will be presented in the form of a stroke (more exactly a part of an arc).

FIG. 2 shows how this drawback can be avoided. To each of the output lines 12 and 13 in the arrangement according to FIG. 1 there is respectively connected a sensing circuit 15 and 16. In each the sine- and the cosine voltage respectively is sensed when the coincidence pulse is obtained from output 14 of the comparator circuit 10. Thus on the output of the circuit 15 a pulse is obtained having an amplitude at the moment of coincidence which is proportional to the instantanous value of $R \cdot \sin 2\pi ft$, i.e. to the X-coordinate of the target. From the output of the circuit 16 a pulse is obtained having an amplitude at the coincidence moment which is proportional to the instantaneous value of $R \cdot \cos 2\pi ft$, i.e. to the Y-coordinate of the target. These Y- and X-pulses are supplied to pulse extenders 17 and 18 where they are extended with unaltered amplitude and are supplied through the output lines 19 and 20 to the deflecting means of the indicator I. The deflecting means are normally not supplied by signals which implies that if the control grid of the indicator all the time should have a high potential, a point would be obtained in the centre of the indicator screen during all the time no target is represented. In order to prevent this the control grid of the electron gun of the indicator is normally kept at so low or cutoff potential that a brightening pulse is obtained only during the time the extended sampling pulses on the outputs 19 and 20 exist. The coincidence pulse obtained on the output line 14 of the comparator circuit 10 is delayed in a delay circuit 22, is extended in a pulse extender 23 and is supplied from the output line 24 of pulse extender 23 as a brightening pulse to the control grid of the indicator tube. The brightening pulse should suitably occur during the later part of the extended pulses from extenders 17 and 18 so that a possible building-up process in the deflecting means of the indicator tube may be finished before the brightening pulse occurs.

FIG. 3 shows a further modification of the arrangement according to FIG. 1. The difference is the one that the digitally controlled attenuator 8 has been replaced by two digitally controlled attunators 8′ and 8″ the stages of which are parallelly connected to corresponding register positions. Between the filter 7 according to FIG. 1 and one of the attenuators, for example attenuator 8′, there is connected the phase shifting network 9 which in the arrangement according to FIG. 1 is connectd to the output of the attenuator 8. In this manner the amplitudes of the sine- and the cosine voltages are controlled individually in dependence on the distance or range information obtained from the register 11. The advantage of this arrangement is that the sine- and the cosine voltages here occur simultaneously on the deflection plates 35 of indicator I in comparison with the arrangement according to FIG. 1 where the cosine voltage occurs delayed by 90°. This could otherwise imply that the deflection is caused only by the sine voltage during ¼ period which in unfavorable cases may result in an incorrect presentation of a point.

Up to now the conversion has been described in connection with indicators with fixed coil systems. Certain indicators are however provided with a rotating coil system 53 as shown in FIG. 4. In such an indicator the coil system is located around the neck portion of the indicator tube and it rotates in step with the antenna of the radar set in question. The counting circuit earlier mentioned consists in this case of a code disc. This is in this case fixedly connected with the coil system, the rate of rotation of which suitably is considerably greater than the rate of rotation of the antenna. The arrangement is described in connection with FIG. 4. Similarly to FIG. 1, a series-to-parallel converter, for example a shift register, is designated by numeral 2. By numeral 4 is designated a gate for the transmission of data from the shift register 2 to the two registers 11 and 21. Digitally controlled attenuator 8 transmits from its output 25 a direct voltage which is proportional to the binary number stored in thte register 11 and corresponding to the distance of the target in question. The output 25 is connected to the deflecting means 52 of the indicator instead of to the scanning circuit thereof. If the control grid of the electron gun of the indicator tube should be kept at a positive potential the electron beam on the indicator screen would consequently trace a circle having a radius which is proportional to the distance coordinate of the target in question. In FIG. 4 a code disc 61 rotates synchronously with the coil system of the indicator and delivers a binary word for each angle position in known manner. The signals of the code disc are supplied to an amplifier 62 on the outputs of which the binary words are obtained which indicate the angle position of the circular movment, i.e. the instantaneous azimuth. To a comparator circuit 10 are connected the outputs of the amplifier 62 and the outputs of the register 21 in the same manner as in the arrangement according to FIG. 1. When the signals on all outputs coincide with each other the electron beam of the indicator tube 52 is deflected in the direction corresponding to the azimuth of the target in question. Then the comparator circuit 10 supplies a coincidence pulse to the output 14. The latter is connected to the control grid of the indicator tube which grid normally has a negative potential. The coincidence pulse which is positive then acts as a brightening or intensifying pulse, so that a point is presented on the screen of the indicator tube at a correct distance as well as in a correct azimuth direction. When presentation of the target has been carried out the arrangement is ready to receive the coordinates of the next target in the bistable circuit registers.

In the description it has been assumed that the azimuth is coded in binary form, the counter 6 consisting of either a binary counter or the code disc 61 being designed for a binary code. If the azimuth is indicated in any other code, the counter 6 and the code disc 61 should of course use the same number system. For example the azimuth can be given in binary-coded decimal form and in this case the counter 6 has to be a binary-coded decimal counter and the code disc 61 has to be provided with a code pattern of binary-coded decimal type.

We claim:
1. Apparatus for presenting in the form of a point on the screen of an indicator tube a target by means of its polar coordinates which are obtained in the form of a binary word, said apparatus comprising in combination:
  (a) a shift register means at which binary target data arrive in series form and are stepped forward upon the receiving of each binary digit of the word;
  (b) a gating means which is opened when all the information concerning the target has been stepped forward in said shift register;
  (c) a first register means for storing distance information corresponding to one polar coordinate;
  (d) a second register means for storing azimuth information corresponding to another polar coordinate, said two register means producing simultaneous digit output signals corresponding to each of the binary digits stored;
  (e) a code disc rotating with a definite speed and producing binary signals forming binary words, each binary word being representative for a definite angular position of said disc;
  (f) an amplifier means supplied by said binary signals from the code disc for converting said binary signals to signa's comparable with the output signals from said other register means;
  (g) a digital-analog converter means for converting the output signals from said first register means to an analog signal corresponding to said binary distance information;
  (h) an indicator tube having deflecting means rotating synchronously with said code disc so that the electron beam of said indicator tube carries out a circular scanning movement on the screen of said indicator tube with a radius propositional to said distance information;
  (i) suppressing means for suppressing said electron beam so as to be invisible on said screen;
  (j) and a comparator means supplied by said simultaneous output signals from said second register means and from said amplifier means for supplying upon coincidence of said signals, inhibiting pulse signals to said suppressing means so as to render said electron beam visible at the point corresponding to said azimuth information.

2. Apparatus for presenting on the screen of an indicator device a point indicating the range and azimuth of a target in polar coordinates of distance and angle wherein the polar coordinates are represented by binary words, said indicator device further including an electron beam orthogonal deflection means and an electron gun with a control grid, said apparatus comprising in combination:
  (a) means for receiving and storing the binary words representing the polar coordinates;
  (b) means for generating and counting periodically recurring pulse signals;
  (c) means connected to said pulse generating means for generating equi-amplitude orthogonally displaced deflection voltages;
  (d) means connected to said receiving and storing means for attenuating said deflection voltages in accordance with the value of the binary word representing the distance polar coordinate;
  (e) means for transmitting the attenuated deflection voltages to the orthogonal deflecting means whereby a circular scan having a radius proportional to the distance polar coordinate is generated by the indicator device;
  (f) means for comparing the instantaneous count of the periodically recurring pulse signals and the binary word representing the angle polar coordinate to generate a control signal upon the sensing of equality of the binary count and said binary word;
  (g) and means receiving the control signal for energizing the control grid whereby the screen of the indicator displays a point only when said equality is sensed.

3. The apparatus of claim 2 and further comprising means for transmitting the attenuated deflecting voltages to said orthogonal deflecting means only for given periods of time after said sensing of equality of the binary count and the binary word.

4. The apparatus of claim 2 wherein said means for receiving and storing the binary words comprises a shift register means for receiving serially the digits of the binary words representing distance and angle polar coordinates, a first storage register for storing the binary word representing the distance polar coordinate, a second storage register for storing the binary word representing the angle polar coordinate, and gate means for controlling the transfer of the binary words stored in said shift register to said first and second storage register.

5. The apparatus of claim 4 wherein the means for generating the periodically recurring pulse signals includes means for generating pulse signals with a frequency $f$, a binary counter means including a plurality of cascaded binary counter stages each with outputs wherein the output of the last stage generates signals having a frequency $f/2^n$.

6. The apparatus of claim 5 wherein said deflection voltage generating means includes a filter means having an input for receiving the signal having a frequency $f/2^n$ and an output for generating a sinusoidal signal having said frequency, and a phase shifting network having an input for receiving said sinusoidal signal and first and second outputs for transmitting sinusoidal signals phase dis-p'aced by ninety degrees.

7. The apparatus of claim 6 wherein said deflection voltage attenuating means is a digitally controlled attenuator having control inputs connected to said first storage register and which is operatively interposed between said filter means and the input of said phase shifting network.

8. The apparatus of claim 7 and further comprising: a first gating circuit means having an input connected to the first output of said phase shifting network, an output, and a control input; a first signal duration extender means having an input connected to the output of said first gating circuit an an output connected to said orthogonal deflecting means; a second gating circuit means having an input connected to the second output of said phase shifting network, an output and a control input; a second signal duration extender means having an input connected to the output of said secod gating circuit and an output connected to said orthogonal deflecting means; third signal duration extender means connected between said comparator means and the control grid of said electron gun; and means for connecting the control inputs of said gating circuits to said comparator means for receiving said control signals whereby said first and second signal extender means generate time extended pulses in response to the receipt of said control signals to define the instantaneous position of the electron beam and said third signal extender means controls the control grid to intensify the electron beam only during the presence of said time extended pulses.

9. The apparatus of claim 6 wherein said deflection voltage attenuating means comprises first and second digitally controlled attenuators having control inputs connected to said first storage register, said first digitally controlled attenuator being operatively itnerposed between the input and the first output of said phase shifting network and said second digitally controlled attenuator being operatively interposed between the input and the second output of said phase shifting network.

10. The apparatus of claim 9 further comprising: a first gating circuit means having an input connected to the first output of said phase shifting network, an output and a control input, a first signal duration extender means having an input connected to the output of said first gating circuit and an output connected to said orthogonal deflecting means; a second gating circuit means having an input connected to the second output of said phase shifting network, an output and a control input; a second signal duration extender means having an input connected to the output of said second gating circuit and an output connected to said orthogonal deflecting means; third signal duration extender means connected between said comparator means and the control grid of said electron gun; and means for connecting the control inputs of said gating circuits to said comparator means for receiving said control signals whereby said first and second signal extender means generate time etxended pulses in response to the receipt of said control signals to define the instantaneous position of the electron beam and said third signal extender means control the control grid to intensify the electron beam only during the presence of said time extended pulses.

References Cited

UNITED STATES PATENTS 3,270,337  8/1966  Howard _____ 343—5

OTHER REFERENCES

Evandia, W. J.: Cutting Through Clutter in Flight-Control Radar, In Electronics, vol. 37, No. 22, Aug. 10, 1964. TK7800E58 pp. 83–89.

RODNEY D. BENNETT, *Primary Examiner.*

CHESTER L. JUSTUS, *Examiner.*

D. C. KAUFMAN, *Assistant Examiner.*